United States Patent
Kimura et al.

(10) Patent No.: US 6,787,971 B2
(45) Date of Patent: Sep. 7, 2004

(54) VIBRATION WAVE DRIVING DEVICE AND METHOD OF PROCESSING VIBRATING MEMBER OR MOVING MEMBER FOR USE IN VIBRATION WAVE DRIVING DEVICE

(75) Inventors: Atsushi Kimura, Tochigi (JP); Yutaka Maruyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 10/151,153

(22) Filed: May 21, 2002

(65) Prior Publication Data

US 2002/0175595 A1 Nov. 28, 2002

(30) Foreign Application Priority Data

May 24, 2001 (JP) ........................................ 2001-155800

(51) Int. Cl.[7] .............................................. H01L 41/08
(52) U.S. Cl. ................................................ 310/323.02
(58) Field of Search ........................... 310/323.02, 328, 310/323.03, 323.04, 323.12, 323.16

(56) References Cited

U.S. PATENT DOCUMENTS

| | | | |
|---|---|---|---|
| 5,099,167 A | 3/1992 | Kimura et al. | 310/323 |
| 5,128,580 A | 7/1992 | Maeno et al. | 310/323 |
| 5,140,214 A | 8/1992 | Kimura et al. | 310/323 |
| 5,155,407 A | 10/1992 | Kimura et al. | 310/323 |
| 5,180,941 A | 1/1993 | Seki et al. | 310/323 |
| 5,192,890 A | 3/1993 | Kimura et al. | 310/323 |
| 5,241,234 A | 8/1993 | Seki et al. | 310/323 |
| 5,274,294 A | 12/1993 | Kimura et al. | 310/323 |
| 5,484,216 A | 1/1996 | Kimura et al. | 400/319 |
| 5,594,291 A | 1/1997 | Tamai et al. | 310/323 |
| 5,596,242 A | 1/1997 | Seki et al. | 310/328 |
| 5,698,929 A | 12/1997 | Seki et al. | 310/323 |
| 5,739,623 A * | 4/1998 | Kanazawa et al. | 310/323.12 |
| 5,770,916 A | 6/1998 | Ezaki et al. | 310/366 |
| 5,917,269 A | 6/1999 | Maruyama et al. | 310/323 |
| 6,046,526 A | 4/2000 | Maruyama | 310/323.06 |
| 6,051,911 A | 4/2000 | Kojima et al. | 310/323 |
| 6,150,749 A * | 11/2000 | Tamai et al. | 310/323.12 |
| 6,191,520 B1 | 2/2001 | Maruyama et al. | 310/323.06 |
| 6,559,574 B2 * | 5/2003 | Maruyama | 310/323.02 |

FOREIGN PATENT DOCUMENTS

| | | |
|---|---|---|
| JP | 10-42579 | 2/1998 |
| JP | 10-75588 | 3/1998 |

* cited by examiner

Primary Examiner—Mark Budd
(74) Attorney, Agent, or Firm—Fitzpatrick, Cella, Harper & Scinto

(57) ABSTRACT

A vibration wave driving device that may be manufactured in a short time and with high accuracy includes a vibrating member which has an elastic member and an electromechanical energy conversion element and which causes vibration when a drive signal is applied to the electromechanical energy conversion element, and a moving member coming into contact with the vibrating member and driven by the vibration, where contact portions of the vibrating member and the moving member are formed such that at least one contact portion protrudes toward the other contact portion and that the vibrating member or the moving member having the protruding contact portion has in a same plane as an end surface of the protruding contact portion a surface of a part other than the protruding contact portion.

10 Claims, 7 Drawing Sheets

VIBRATION WAVE DRIVING DEVICE AND METHOD OF PROCESSING VIBRATING MEMBER OR MOVING MEMBER FOR USE IN VIBRATION WAVE DRIVING DEVICE

BACKGROUND OF THE INVENTION

1. Field of the Invention

The present invention relates to the construction of a contact portion of a vibrating member or a moving member for use in a vibration wave driving device, and to a method of processing this contact portion.

2. Related Background Art

A vibration wave motor, which is a vibration wave driving device, has a vibrating member generating vibration serving as a drive source, and this vibrating member is composed of an elastic member and a piezoelectric element serving an electro-mechanical energy conversion element. A piezoelectric element has two drive phases that have a phase shift of, for example, 90 degrees. When drive signals (alternating signals) having a phase shift of 90 degrees are applied to these two drive phases, a vibration which is a traveling wave is generated wave is generated on the surface of the elastic member. When a rotor is brought into press contact with this elastic member, the rotor is driven by the traveling wave generated on the surface of the elastic member.

Conventional well-known vibration wave motors of the type in which a rotor is rotated are annular, disc-like, or bar-like configurations. In the following, the construction of a bar-like vibration wave motor will be described.

FIG. 12 is a sectional view of an example of a conventional bar-like vibration wave motor. A vibrating member 1 generating vibration is constructed of elastic members 9 and 10 formed of metal or the like; a frictional ring 9b attached to the forward end surface of the elastic member 9 by adhesion, brazing or the like and formed, for example, of alumina ceramics; and a laminated piezoelectric element 11 held between the elastic members 9 and 10 and serving as a layered electromechanical energy conversion element.

After attaching the frictional ring 9b to the elastic member 9, the surface of the frictional ring 9b which is on the opposite side of the attachment surface, that is, the frictional surface, is polished to enhance its flatness and to smoothen its surface.

At the center of the elastic member 9, the piezoelectric element 11, and the elastic member 10, there is formed a through-hole, into which a support bar 5 constituting a framework member of the motor is inserted. One end portion of the support bar 5 protrudes beyond the elastic member 10, and a nut 6 is engaged with a screw portion 5b formed on the protruding portion. The support bar 5 has a large diameter portion 5a in contact with a step formed on the inner side of the elastic member 9. By fastening the nut 6, the elastic member 9, the laminated piezoelectric element 11 and the elastic member 10, which are held between the large diameter portion 5a and the nut 6, are pressed against each other and secured in position.

Reference numeral 2 indicates a rotor (moving member) arranged opposite the forward end surface of the elastic member 9. It is composed of a cylindrical main body 21 and a contact spring 22 fitted onto the outer periphery of the main body 21, and both components are joined together by adhesion, welding or the like. The rotor 2 is engaged with an output gear 4 rotating integrally with the rotor 2; this gear 4 slides on a motor mounting flange 7 through the intermediation of lubricating oil. A screw portion 5c at the other end of the support bar 5 is fixed to the flange 7, and the vibrating member 1 is supported by fixing the flange 7 to a bottom board (not shown) by means of a screw. On the inner wall of the through-hole at the center of the main body 21 of the rotor 2, there is formed a step constituting a spring seat portion 21a, and a pressure spring 8 is arranged between the spring seat portion 21a and the output gear 4, the contact spring 22 of the rotor 2 being brought into press contact with the frictional ring 9b of the vibrating member 1.

The driving principle of the vibration wave motor of FIG. 12 is as follows. A detailed description of the laminated piezoelectric element 11 will be omitted. When a two-phase alternating voltage is applied to the laminated piezoelectric element 11, an expansion and contraction movement is generated in the laminated piezoelectric element 11, and primary bending natural vibrations in a direction parallel to the plane of FIG. 12 and a direction perpendicular to the plane of FIG. 12 are generated in the vibrating member 1. When the two vibrations are generated with a phase shift in time of 90 degrees, a rightward or a leftward circular motion is generated in the vibrating member 1 around the position of the support bar 5 in case that there is no vibration. The elastic member 9 has a groove 9a for enlarging the vibration displacement, and a swinging motion as indicated by the arrows of FIG. 12 is generated at the forward end of the elastic member 9. As seen from the contact surface (the upper surface of the frictional ring), this vibration corresponds to a 1-wave traveling wave. When the rotor 2 having the contact spring 22 is brought into pressure contact with the vibrating member 1, the rotor 2 comes into contact with the upper surface of the frictional ring 9b with only one portion thereof in the vicinity of the antinode of the traveling wave shifted to the rotor side of the vibrating member 1, and rotates in the direction opposite to the traveling direction of the traveling wave. The rotation output of the rotor 2 is extracted by the gear 4 engaged with the main body 21 of the rotor 2 and the flange 7.

The natural mode of the vibrating member 1 is designed such that the vibration amplitude of the flange 7 is very small, and the main body 21 of the rotor 2 is designed such that its inertial mass is large enough not to allow any vibration to be caused by the excitation of the vibrating member 1. Further, the contact spring 22 of the rotor 2 is designed such that its natural frequency is sufficiently higher than the driving frequency of the vibrating member and that it follows the vibration.

Note that the contact spring 22 of the rotor 2 is formed through heat treatment of stainless steel to achieve an increase in hardness to thereby enhance wear resistance, and there is no fear that edge chipping will occur as in the case of a contact spring formed of anodized aluminium. The frictional ring 9b is harder than the contact spring 22. Since it is mainly the contact spring 22 that is worn, the frictional ring 9b is hardly rutted.

Here, the contact spring 22 of the rotor 2 will be described with reference to the enlarged view of FIG. 13.

The contact spring 22 is composed of a thin-walled spring portion 22a having elasticity mainly in the radial direction, a thin-walled spring portion 22b which is a flange portion connected to the spring portion 22a and having elasticity in the axial direction, and a forward end portion 22c connected to the spring portion 22b. As stated above, the end surface of the forward end portion 22c constituting the surface coming into contact with the frictional ring 9b is polished to enhance its flatness and to be smoothened after attaching the contact spring 22 to the main body 21.

Note that when the contact spring 22 is formed by a press or the like, the end surface of the forward end portion 22c prior to the processing is not flat as shown in FIG. 14, and there is a fluctuation in an axial dimension H. Thus, it is necessary to flatten the end surface of the forward end portion 22c by grinding or rough-polishing and to attain a predetermined axial dimension before performing finish polishing.

In the case of grinding, it is possible to accurately attain the axial dimension H of the forward end portion 22c. However, large burr is generated at the end surface, which leads to a rather long finish polishing time. Further, in the case of rough-polishing, the end surface can be formed neatly. However, due to the small width of the end surface, the polishing is finished in a short time, so that the fluctuation in the axial dimension H is likely to be rather large. Even so, it is not desirable to perform finish polishing from the beginning since, in that case, it would take even longer till a predetermined dimension is achieved.

Thus, there seems to be room for improvement from the viewpoint of processing the forward end portion 22c of the contact spring 22 in a short time and with high accuracy.

SUMMARY OF THE INVENTION

In accordance with the present invention, there is provided a vibration wave driving device including: a vibrating member which has an elastic member and an electromechanical energy conversion element and which causes vibration when a drive signal is applied to the electromechanical energy conversion element, and a moving member contacting the vibrating member and driven by the vibration, where contact portions of the vibrating member and the moving member are formed so that at least one contact portion protrudes toward the other contact portion and that the vibrating member or the moving member having the protruding contact portion has a surface of a part other than the protruding contact portion in the same plane as the end surface of the protruding contact portion.

When the end surface of the contact portion and the surface of the part other than the contact portion, provided in the same plane, are simultaneously polished, it will be easy to restrain fluctuation in the finish dimension attained by polishing.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Vibration wave motors to which the present invention is applied will be described with reference to FIGS. 1 through 11.

Figure 1:
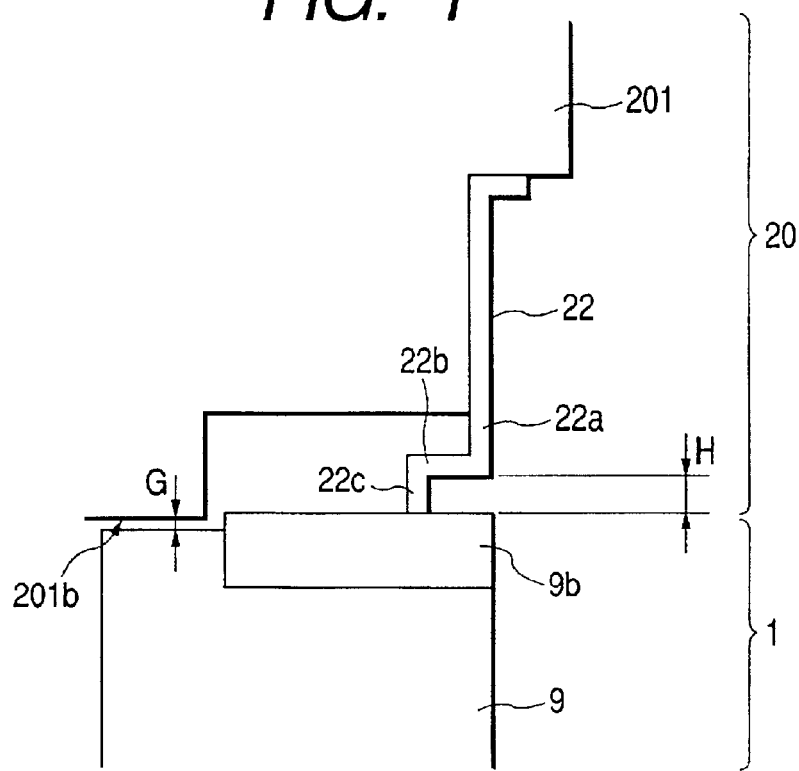
FIG. 1 is an enlarged sectional view of contact portions of a rotor and a vibrating member of a bar-like vibration wave motor according to an embodiment of the present invention.
Figure 13:
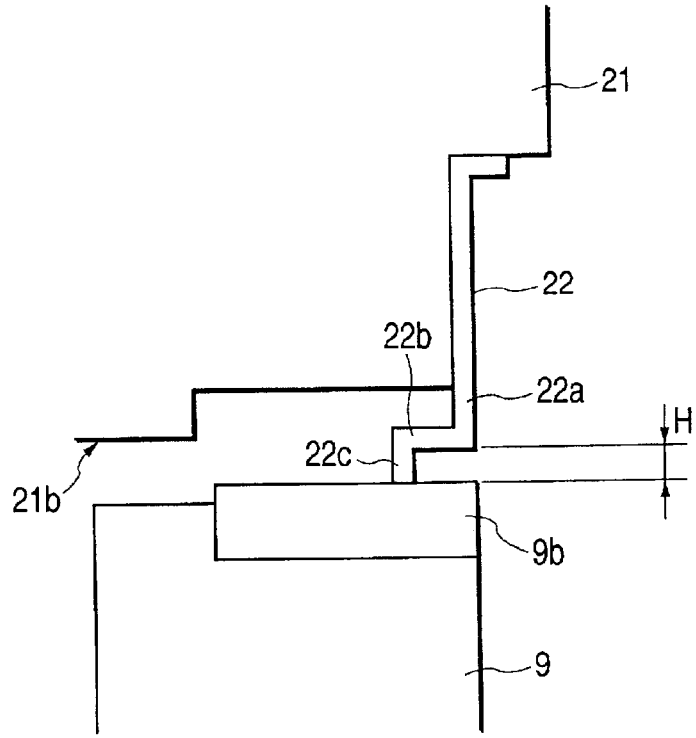
FIG. 13 is an enlarged sectional view of contact portions of the rotor and the vibrating member of a conventional bar-like vibration wave motor.
Figure 14:
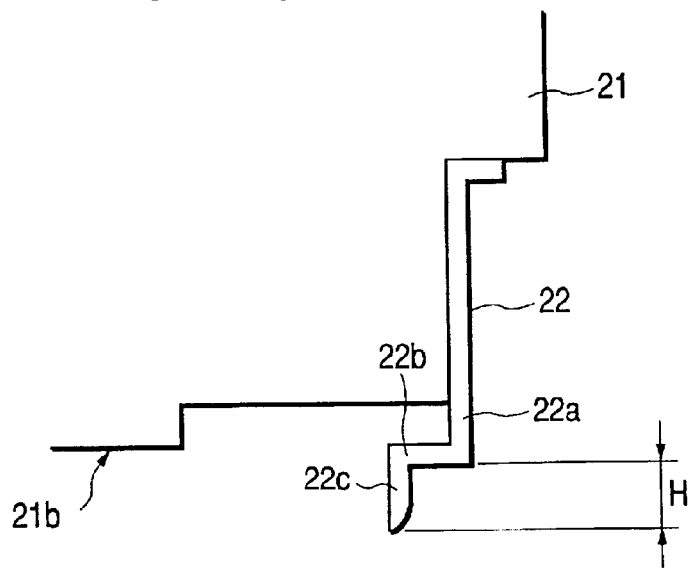
FIG. 14 is an enlarged sectional view of the rotor of a conventional bar-like vibration wave motor prior to rough polishing.

FIG. 1 is an enlarged sectional view of contact portions of vibrating member 1 and a rotor 20 of a bar-like vibration motor to which an embodiment of the present invention is applied. In the drawing, the components which are the same as those shown in FIG. 13, showing a prior-art example, are indicated by the same reference numerals.

In the drawing, an end surface of a forward end portion 22c of a contact spring 22 of the rotor 20, that is, the frictional surface, is positioned in the same plane as a vibrating-member-side end surface 201b of a rotor main body 201. In the following, the processing steps until the final configuration is attained will be described.

Figure 2:
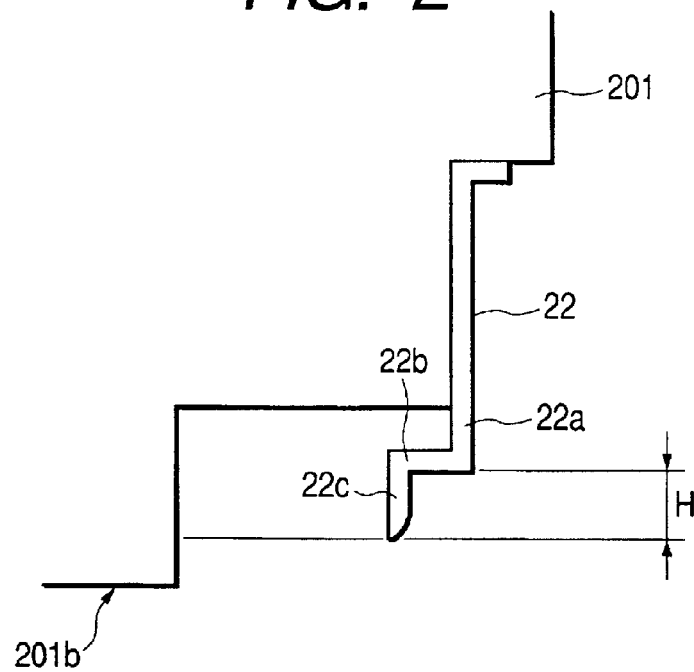
FIG. 2 is an enlarged sectional view of the rotor of the bar-like vibration wave motor of FIG. 1 prior to rough polishing.
Figure 3:
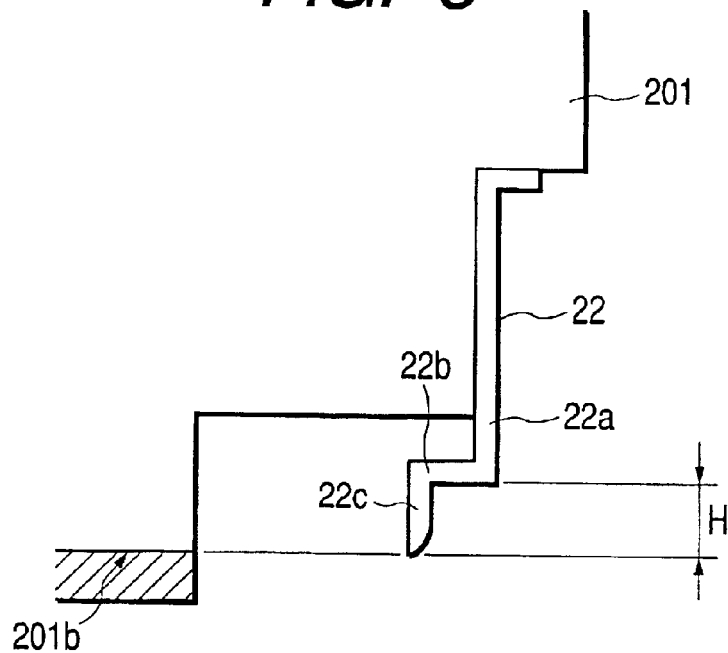
FIG. 3 is an enlarged sectional view of the rotor of the bar-like vibration wave motor of FIG. 1 during rough polishing.
Figure 4:
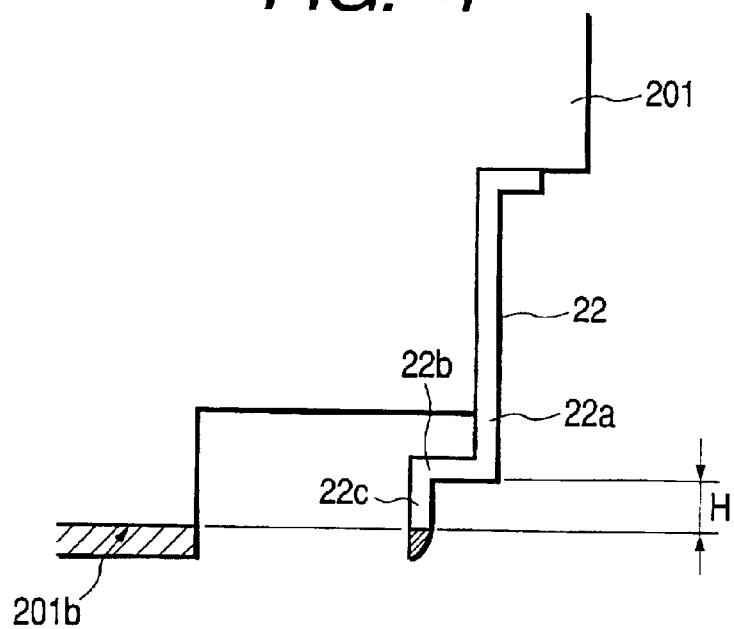
FIG. 4 is an enlarged sectional view of the rotor of the bar-like vibration wave motor of FIG. 1 after rough polishing.

FIG. 2 is a sectional view showing the pre-processing state immediately after the connection of the contact spring 22 and the main body 201. The vibrating-member-side end surface 201b of the rotor main body 201 protrudes beyond the end surface of the forward end portion 22c of the contact spring 22 toward the vibrating member 1 side. As shown in FIG. 3, the vibrating-member-side end surface 201b of the main body 201 of a rotor 2 (the shaded portion of FIG. 3) is first cut off by rough polishing. Then, as shown in FIG. 4, after the vibrating-member-side end surface 201b has been positioned in the same plane as the end surface of the forward end portion 22c, rough polishing is performed on both until a predetermined dimension H is attained (as indicated by the shaded portions of FIG. 4).

If rough polishing is performed only on the forward end portion 22c of the contact spring 22 as in the prior art, the polishing rate is rather high, so that the adjustment of the polished amount is difficult to perform. However, due to the above-mentioned arrangement, the polishing area increases, so that the polishing rate becomes lower, making it easy to restrain the fluctuation in the dimension H. Further, due to the increase in the polishing area, it is possible to prevent the rotor from running out of control during polishing operation. Thus, it is possible to prevent deformation of the forward end portion 22c of the contact spring 22 and chipping of the edge thereof.

Thereafter, finish polishing is performed simultaneously on the vibrating-member-side end surface 201b of the rotor main body 201 and the end surface of the forward end portion 22c of the contact spring 22. As in the rough polishing, the polishing area is larger than that in the conventional example, so that there is no danger of the rotor 20 running out of control.

Note that in the finish polishing, an appropriate load is applied in order to avoid spending too much time due to the increase in polishing area. Conventionally, only the weight of the rotor has been utilized without applying any load since too much load can lead to plastic deformation of the contact spring 22. In this embodiment, there is no fear of plastic deformation since the finish polishing is simultaneously performed on the contact spring 22 and the main body 201.

Further, when the rotor 20 of this embodiment is used, a gap G (shown in FIG. 1) between the vibrating-member-side end surface 201b and an elastic member 9 is generally reduced. Thus, when the rotor 20 receives a large impact from outside, the end surface 201b comes into contact with the elastic body 9 before the forward end portion 22c undergoes drastic deformation, whereby it is possible to prevent fatal deformation of the forward end portion 22c.

Note that since the main body 201 constitutes a component separate from the contact spring 22, it can be formed by sintering, die-casting or the like, thereby achieving a reduction in cost.

Figure 5:
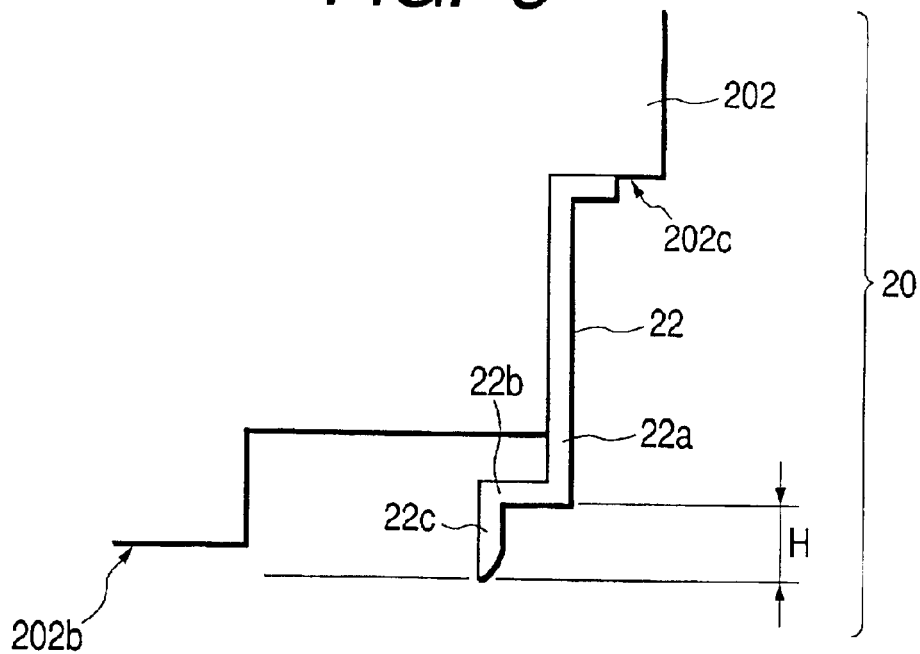
FIG. 5 is an enlarged sectional view of the rotor of the bar-like vibration wave motor according to another embodiment of the present invention prior to rough polishing.
Figure 6:
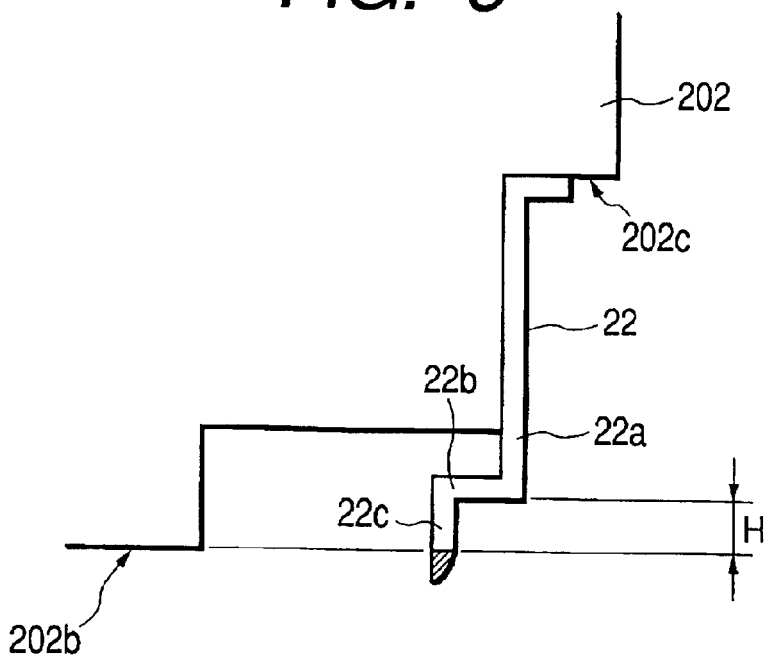
FIG. 6 is an enlarged sectional view of the rotor of the bar-like vibration wave motor of FIG. 5 during rough polishing.

FIGS. 5 and 6 are enlarged sectional views of contact portions of the vibrating member 1 and the rotor 2 of the bar-like vibration wave motor to which another embodiment of the present invention is applied. This embodiment differs from the above-described one in the partial configuration of the rotor 20 and the polishing process.

FIG. 5 is a sectional view showing the state immediately after the connection of the contact spring 22 and a main body 202. In the state prior to the polishing, the forward end portion 22c of the contact spring 22 of the rotor 20 protrudes beyond a vibrating-member-side end surface 202b of the rotor main body 202 toward the vibrating member 1 side. This is due to the fact that, when joining the contact spring 22 to the main body 202, the contact spring 22 is fitted from underside of the drawing onto the main body 202 and abutted against an abutment surface 202c of the main body, so that as shown in FIG. 2, protrusion of the vibrating-member-side end surface 202b of the rotor main body 202 beyond the end surface of the forward end portion 22c toward the vibrating member 1 side would result in poor operability.

In this case, the tip (the shaded portion in FIG. 6) of the forward end portion 22c of the contact spring 22 is first cut off by rough polishing until it becomes flush with the vibrating-member-side end surface 202b of the rotor main body 202, and then rough polishing is performed on both until the predetermined dimension H is attained to thereby achieve the configuration as shown in FIG. 1 (the shaded portions in FIG. 4). Thereafter, finish polishing is performed as in the first embodiment.

Figure 7:
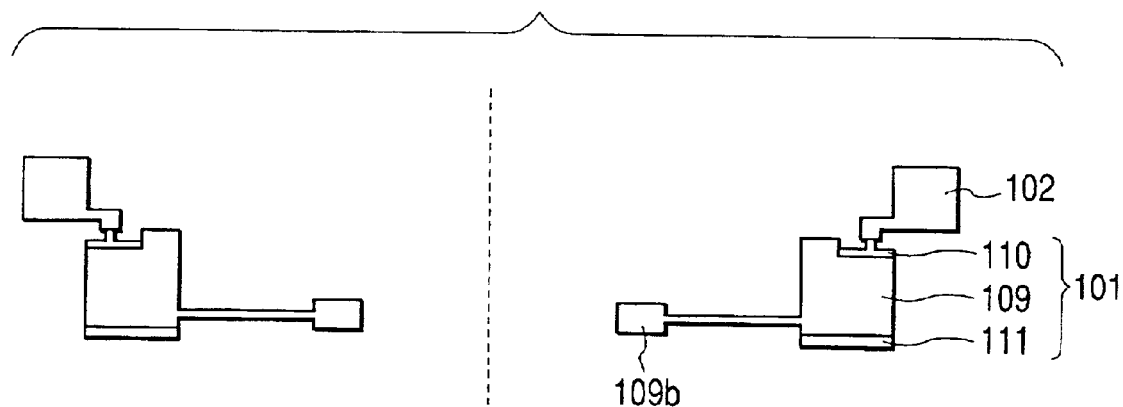
FIG. 7 is a sectional view of the contact portions of the rotor and the vibrating member of an annular type vibration wave motor according to still another embodiment of the present invention.

FIG. 7 is a sectional view of a main portion of an annular vibration wave motor to which still another embodiment of the present invention is applied. In the drawing, reference numeral 101 indicates a vibrating member consisting of a ring-like elastic member 109 to one end surface of which a piezoelectric element 111 is attached and to the other end surface of which a frictional member 110 is attached. A support portion 109b for fixation to a case (not shown) being provided on the inside diameter side of the elastic member 109.

Reference numeral 102 indicates a rotor formed, for example, of an aluminium alloy with silicon diffused therein; it is held in press contact with the frictional member 110 of the vibrating member 101 by a pressure spring (not shown).

When the frictional member 110 is formed of a material softer than the rotor, such as resin, the frictional member 110 is subject to abrasion due to the relative frictional sliding of the vibrating member 101 and a rotor 102, and such abrasion will cause the frictional member 110 to be rutted, resulting in a deterioration in performance. To prevent this, as shown in the enlarged sectional view of the contact portions of FIG. 8, there is provided on the frictional member 110 a protrusion 110a having a width that is smaller than the width of the end surface of the frictional portion of the rotor 102.

The frictional surface of the protrusion 110a of the frictional member 110 is polished to be enhanced in flatness and smoothened. A protrusion 109a is provided on the inner peripheral side of the elastic member 109, and, as in the case of the rotor 20 of the above-described bar-like vibration wave motor, the two protrusions 109a and 110a are polished simultaneously, whereby it is possible to prevent the polishing from being effected too quickly. Further, fluctuation in a dimension H1 shown in FIG. 8 can be easily restrained, and it is possible to prevent the vibrating member from running out of control during polishing.

Figure 9:
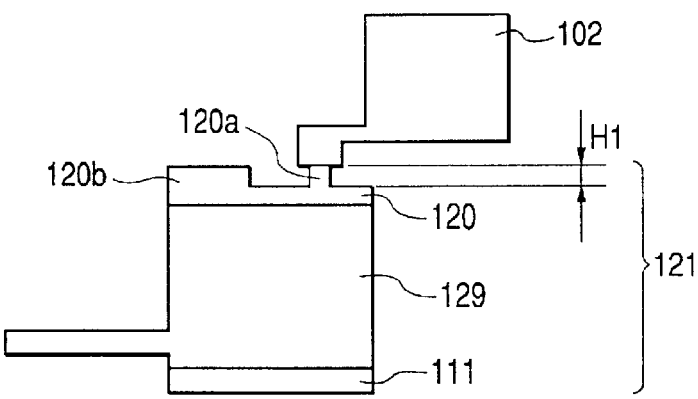
FIG. 9 is an enlarged sectional view of contact portions of the rotor and the vibrating member of the annular type vibration wave motor according to still another embodiment of the present invention.

FIG. 9 is an enlarged sectional view of contact portions of the annular vibration wave motor to which still another embodiment of the present invention is applied.

In this embodiment, a frictional member 120 attached to an elastic member 129 has a first protrusion 120a on the outside diameter side coming into contact with the rotor and a second protrusion 120b on the inside diameter side polished simultaneously with the first protrusion 120a. That is, in the vibration wave motor shown in FIG. 9, when polishing the frictional member 120, the second protrusion 120b has the same function as the protrusion 109a shown in FIG. 8.

Figure 8:
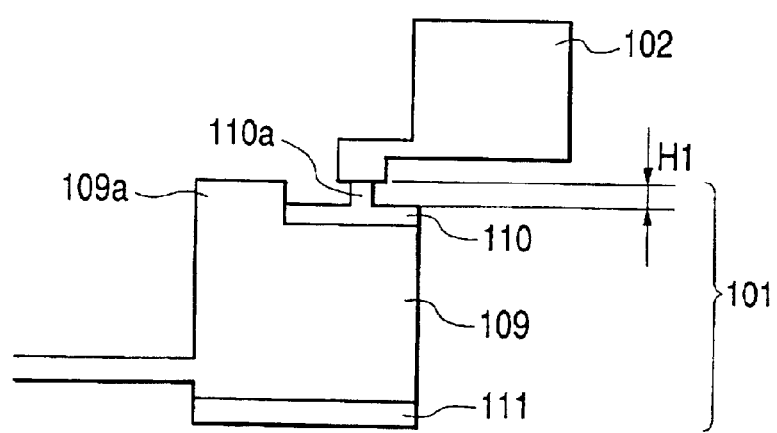
FIG. 8 is an enlarged sectional view of contact portions of the rotor and the vibrating member of the annular type vibration wave motor of FIG. 7.
Figure 10:
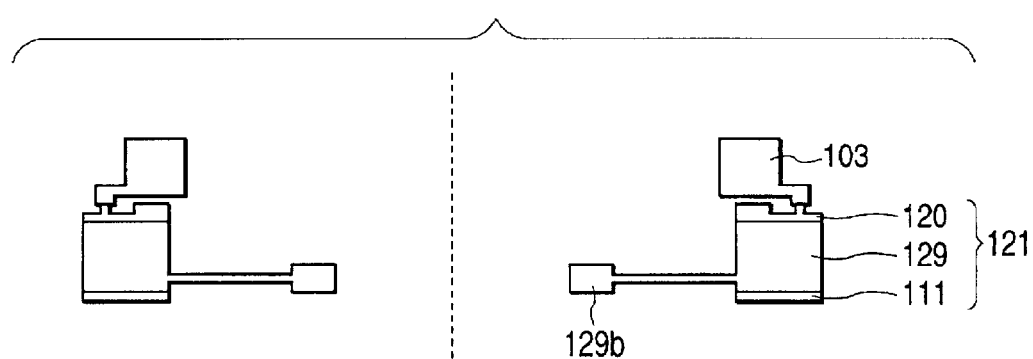
FIG. 10 is a sectional view of contact portions of the vibrating member of the annular type vibration wave motor of FIG. 9 and another rotor.
Figure 11:
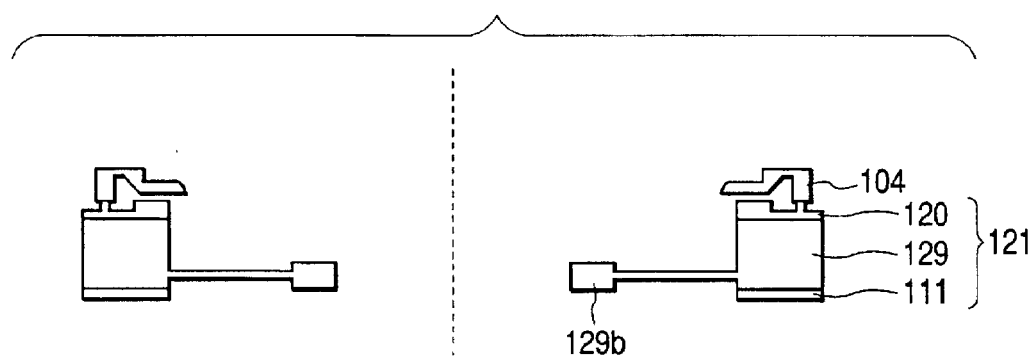
FIG. 11 is a sectional view of contact portions of the vibrating member of the annular type vibration wave motor of FIG. 9 and another rotor.
Figure 12:
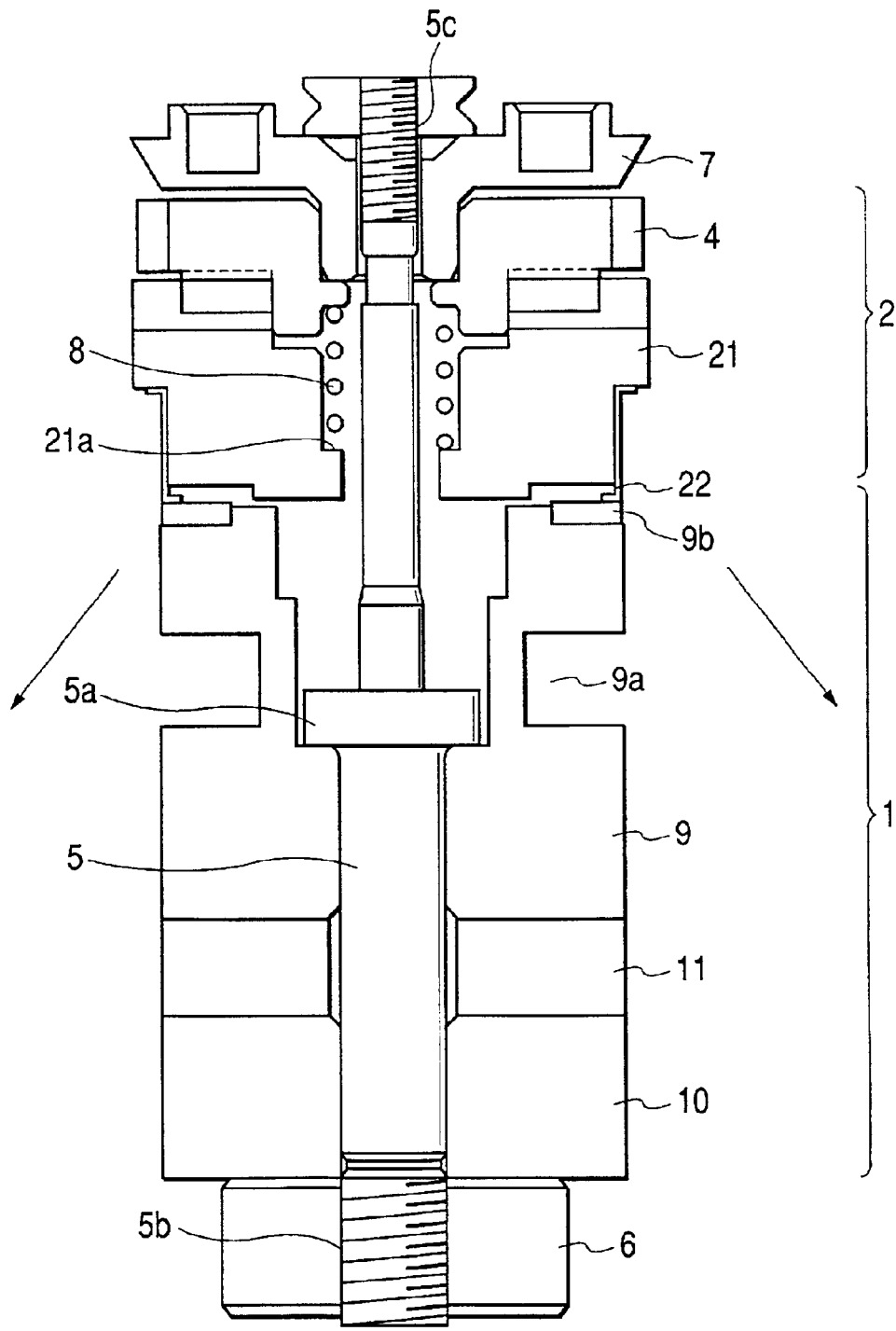
FIG. 12 is a schematic sectional view of a conventional bar-like vibration wave motor.

Note that regarding the rotor configuration, it goes without saying that a rotor 103 of the annular type vibration wave motor as disclosed in Japanese Patent Application Laid-open No. 10-42579, shown in FIG. 10, and a rotor 104 of the annular type vibration wave motor as disclosed in Japanese Patent Application Laid-open No. 10-75588, shown in FIG. 11, are applicable to the vibrating member shown in FIG. 8 or 9.

What is claimed is:

1. A vibration wave driving device, comprising:
a vibrating member, including an elastic member and an electro-mechanical energy conversion element, which generates vibration when a drive signal is applied to the electro-mechanical energy conversion element; and
a moving member contacting the vibrating member and driven by the vibration, the moving member having a main body and an elastic spring member fixed to the main body, the forward end portion of the spring member constituting a protruding contact portion,
wherein a contact portion of the vibrating member and the protruding contact portion of the moving member are formed such that at least the protruding contact portion of the moving member protrudes toward the contact portion of the vibrating member, and that the moving member has in a same plane as an end surface of the protruding contact portion a surface of a part other than the protruding contact portion, wherein the surface of the part other than the protruding contact portion is formed on the main body.

2. A vibration wave driving device according to claim 1, wherein the protruding contact portion and the surface of the part other than the protruding contact portion are formed by a process including simultaneous surface-finishing polishing.

3. A vibration wave driving device according to claim 1, wherein the main body has a cylindrical configuration, and the spring member is fitted onto the outer peripheral portion of the main body.

4. A vibration wave driving device, comprising:
   a vibrating member, including an elastic member and an electro-mechanical energy conversion element, which generates vibration when a drive signal is applied to the electro-mechanical energy conversion element; and
   a moving member contacting the vibrating member and driven by the vibration,
   wherein contact portions of the vibrating member and the moving member are formed such that at least one contact portion protrudes toward the other contact portion and that the vibrating member or the moving member having the protruding contact portion has in a same plane as an end surface of the protruding contact portion a surface of a part other than the protruding contact portion, and
   wherein the vibrating member has a frictional member on the portion contacting the moving member, and the protruding contact portion is formed on the frictional member.

5. A vibration wave driving device according to claim 4, wherein the vibrating member has the surface of the part other than the protruding contact portion formed on the elastic member which has the frictional member formed thereon.

6. A vibration wave driving device according to claim 4, wherein the vibrating member has the surface of the part other than the protruding contact portion formed on the frictional member.

7. A method of processing a moving member of a vibration wave driving device, the device including a vibrating member which has an elastic member and an electro-mechanical energy conversion element and which generates vibration when a drive signal is applied to the electro-mechanical energy conversion element, and where an elastic spring member fixed to a main body of the moving member press contacts the moving member against the vibrating member and the moving member thereby is driven by the vibration, the method comprising:
   fixing the spring member to the main body;
   grinding one of an end surface of the main body and an end surface of the spring member until both end surfaces are positioned in a same plane; and
   simultaneously polishing the end surface of the main body and the end surface of the spring member.

8. A method of processing a moving member of a vibration wave driving device according to claim 7, wherein the end surface of the main body is ground, whereby the end surface of the main body and the end surface of the spring member are positioned in the same plane.

9. A method of producing a moving member of a vibration wave driving device according to claim 7, wherein the end surface of the spring member is ground, whereby the end surface of the main body and the end surface of the spring member are positioned in the same plane.

10. A method of processing a vibrating member of a vibration wave driving device, the device including the vibrating member, which has an elastic member, a frictional member, and an electro-mechanical energy conversion element, and which generates vibration when a drive signal is applied to the electro-mechanical energy conversion element, and a moving member contacting the vibrating member and driven by the vibration, the method comprising:
   grinding one of the end surface of the vibrating member and a frictional surface of the frictional member until they are positioned in the same plane; and
   simultaneously polishing the end surface of the vibrating member and the frictional surface of the frictional member.

* * * * *

UNITED STATES PATENT AND TRADEMARK OFFICE
CERTIFICATE OF CORRECTION

PATENT NO. : 6,787,971 B2
DATED : September 7, 2004
INVENTOR(S) : Atsushi Kimura et al.

It is certified that error appears in the above-identified patent and that said Letters Patent is hereby corrected as shown below:

<u>Column 1,</u>
Line 24, "is generated wave" should be deleted.
Line 40, "electromechanical" should read -- electro-mechanical --.

Signed and Sealed this

Eleventh Day of January, 2005

JON W. DUDAS
*Director of the United States Patent and Trademark Office*